(12) United States Patent
Seto et al.

(10) Patent No.: US 6,782,442 B2
(45) Date of Patent: Aug. 24, 2004

(54) COMPACTPCI HOTSWAP AUTOMATIC INSERTION/EXTRACTION TEST EQUIPMENT

(75) Inventors: Stephen C. Seto, Milpitas, CA (US); Gerald R. Pelissier, Round Rock, TX (US); Maire M. Mahony, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 518 days.

(21) Appl. No.: 09/882,672

(22) Filed: Jun. 15, 2001

(65) Prior Publication Data

US 2002/0194413 A1 Dec. 19, 2002

(51) Int. Cl.⁷ .......................... H05K 7/10; G06F 13/00
(52) U.S. Cl. ...................... 710/302; 710/301
(58) Field of Search .............. 710/301, 302, 710/303, 304

(56) References Cited

U.S. PATENT DOCUMENTS 5,637,001 A * 6/1997 Nony et al. ................. 439/131
6,010,344 A * 1/2000 Muramatsu et al. ........ 439/159
6,046,421 A * 4/2000 Ho .............................. 209/573
6,178,526 B1 * 1/2001 Nguyen et al. ............... 714/42
6,357,022 B1 * 3/2002 Nguyen et al. ............... 714/42
6,618,685 B1 * 9/2003 Bender et al. .............. 702/119
6,662,254 B1 * 12/2003 Tal et al. ..................... 710/300
2002/0174286 A1 * 11/2002 Tamura .......................... 711/4

FOREIGN PATENT DOCUMENTS

JP          08255229 A  * 10/1996 ........... G06K/17/00
JP          09266400 A  * 10/1997 ........... H05K/13/04

* cited by examiner

*Primary Examiner*—Sumati Lefkowitz
*Assistant Examiner*—Trisha Vu
(74) *Attorney, Agent, or Firm*—Osha & May L.L.P.

(57) ABSTRACT

A system for testing insertion and extraction of a hot-swappable card includes an automatic positioning station and a controller. The automatic positioning station inserts the hot-swappable card into a backplane and extracts the hot-swappable card from the backplane. The controller directs the operation of the automatic positioning station and determines whether the hot-swappable card is functioning when inserted into the backplane.

19 Claims, 5 Drawing Sheets

COMPACTPCI HOTSWAP AUTOMATIC INSERTION/EXTRACTION TEST EQUIPMENT

BACKGROUND OF INVENTION

Referring to FIG. 1, computer systems generally include a motherboard (10), which has, among other elements, a central processing unit (CPU) (12), memory (14), and a plurality of slots (16) for receiving circuit cards designed to perform specific functions. Computer system components are generally connected via buses (18), i.e., an electrically-conductive path traced along the motherboard. These buses are used for data transfer among the components. Further, power is delivered to the motherboard through a power connection (20). Then, depending on the component, power is supplied indirectly from the motherboard (10) or directly via a power connection on the component, While it is generally cost effective to have most of the circuitry on a single large motherboard for desktop computers, such a configuration has certain drawbacks that are particularly important to industrial applications. Because the motherboard is usually thin and large enough to flex, breakage of small traces and solder joints on fine pitch surface mount devices may occur when plug-in boards are inserted. The occurrence of such breakage requires motherboard replacement, which requires complete disassembly and reassembly of the computer system.

Particularly in industrial applications, such disassembly and reassembly, and the accompanying downtime, may be unacceptable. Also, given the rapid development of motherboard technology, finding an exact replacement for a motherboard can be difficult or impossible. Further, substitution of a non-exact replacement may cause software problems due to BIOS changes, changing device drivers, and different timing. Thus, standard specifications have been developed for systems and boards for use in industrial and telecommunications computing applications.

These standard specifications allow there to be a combination of components from different manufacturers in a single computer system. ISA (Industry Standard Architecture) is a bus specification that is based on that used in the IBM PC/XT and PC/AT. PCI (Peripheral Component Interconnect) is a local bus specification developed for 32-bit or 64-bit computer system interfacing. Most modern computers have both an ISA bus for slower devices and a PCI bus for devices that need better bus performance. Another specification, VME (VersaModule Eurocard bus) is a 32-bit bus widely used in industrial, commercial, and military applications. VME64 is an expanded version that provides 64-bit data transfer and addressing.

The PCI-ISA passive backplane standard defines backplane and connector standards for plug-in passive backplane CPU boards that bridge to both PCI and ISA buses. The PCI-ISA passive backplane standard moves all of the components normally located on the motherboard to a single plug-in card. The motherboard is replaced with a "passive backplane" that only has connectors soldered to it. Referring to FIG. 2, a typical backplane (22) having a plurality of plug-in slots (24) is shown. CompactPCI is a specification for PCI-based industrial computers that is electrically a superset of PCI with a different physical form factor. CompactPCI uses the Eurocard form factor popularized by the VME bus.

There are two types of "universal" boards: universal signaling environment and universal slot location. Universal signaling environment means that a board can operate in either a 3.3V or 5V bus backplane. With the original PCI specification, it was possible to select a value for the bus pull-up resistor that satisfied the specification for both the 3.3V and 5V signaling environments. With the CompactPCI Specification, it is no longer possible to select a single resistor. Therefore, in order for a CompactPCI board to be capable of operating in a universal signaling environment, the board must provide both 2.7K ohm (+/−5%) and 1.0K ohm (+/−5%) pull-up resistors and provide a way to enable them correctly depending on the signaling environment, Universal slot location describes a board that can function in either the system slot or the non-system slot of a CompactPCI backplane. A system slot board is required to provide the common bus resources for the CompactPCI backplane, namely: bus pull-ups, bus clock, and the bus arbiter. A system slot board is allowed additional capacitive load per signal pin because of these additional features.

In the past, CompactPCI boards were inserted and extracted manually with power removed from the CompactPCI backplane. In certain modern systems however, cards can be removed from or inserted into the backplane while the system is running, i.e., the cards can be "hot-swapped." The CompactPCI bus architecture supports the hot swapping of cards from the backplane. In order to be CompactPCI Hot Swap Specification compliant, every signal pin must be biased to (1V +/−20%) through a minimum 10K ohm resistor prior to insertion into a live or "hot" backplane.

With the introduction of the hot swap technology, CompactPCI boards can be inserted and extracted while maintaining power to the backplane with no damage to the boards that are either already plugged into the backplane or about to be inserted or extracted. Additionally, insertion and extraction of the CompactPCI card shall cause no major disruption, data corruptions, etc., to the running system, and all the CompactPCI cards that are already inserted into the backplane. Historically, in developing CompactPCI hot swap boards, large amounts of manual intervention is required to insert/extract the boards multiple times and in different orders in order to thoroughly test the robustness of the hot swap characteristics of the boards in both hardware and software.

Those skilled in the art will appreciate that other requirements exist in the full CompactPCI specification, Hot Swap Specification, Passive Backplane PCI-ISA Specification, all of which are available from PCI Industrial Computer Manufacturers Group of Wakefield, Mass.

SUMMARY OF INVENTION

In general, in one aspect, the present invention involves a system for testing insertion and extraction of a hot-swappable card comprising an automatic positioning station that inserts the hot-swappable card into a backplane and extracts the hot-swappable card from the backplane; and a controller that directs the operation of the automatic positioning station and determines whether the hot-swappable card is functioning when inserted into the backplane.

In general, in one aspect, the present invention involves a method of testing insertion and extraction of a hot-swappable card comprising inserting the hot-swappable card into a backplane; determining whether the hot-swappable card is functioning when inserted in the backplane; and extracting the hot-swappable card from the backplane.

In general, in one aspect, the present invention involves a software tool for use in testing of a hot-swappable card insertion and extraction comprising a processor; memory in communication with the processor; and software residing in the memory and executable on the processor for instructing an automatic positioning station to insert the hot-swappable card into a backplane and extract the hot-swappable card from the backplane; and determining whether the hot-swappable card is functioning when inserted in the backplane.

In general, in one aspect, the present invention involves an apparatus for testing of a hot-swappable card insertion and extraction comprising a backplane, an automatic positioning station, and a computer. The backplane comprises a plurality of slots for receiving cards. The automatic positioning station is for inserting and extracting the hot-swappable card into the plurality of slots in the backplane. The computer is in communication with the backplane and the automatic positioning system and comprises a processor; memory; and software residing on the memory and executable on the processor. The software is for directing the automatic positioning station to insert and extract the hot-swappable card; and determining whether the hot-swappable card is functioning when inserted into the backplane.

In general, in one aspect, the present invention involves an apparatus for testing of a hot-swappable card insertion and extraction comprising means for inserting the hot-swappable card into a backplane; means for determining whether the hot-swappable card is functioning when inserted in the backplane; and means for extracting the hot-swappable card from the backplane.

Other aspects and advantages of the invention will be apparent from the following description and the appended claims.

DETAILED DESCRIPTION

Figure 1:
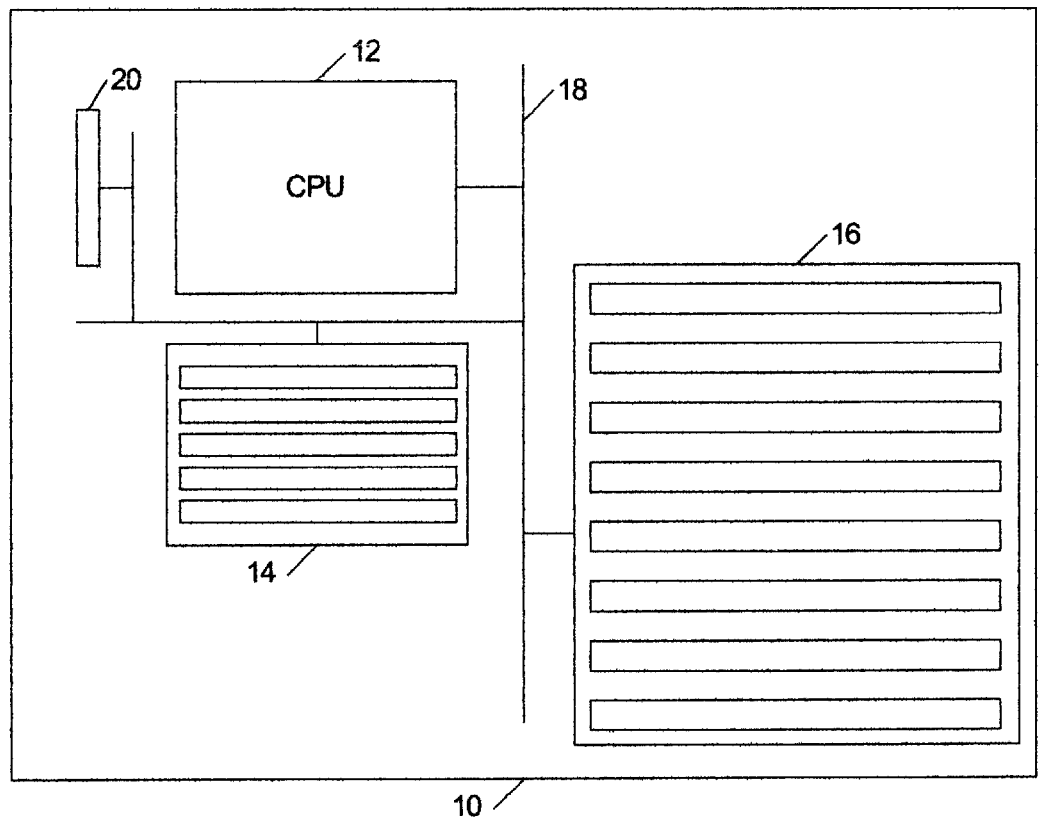
FIG. 1 shows a typical computer system.
Figure 2:
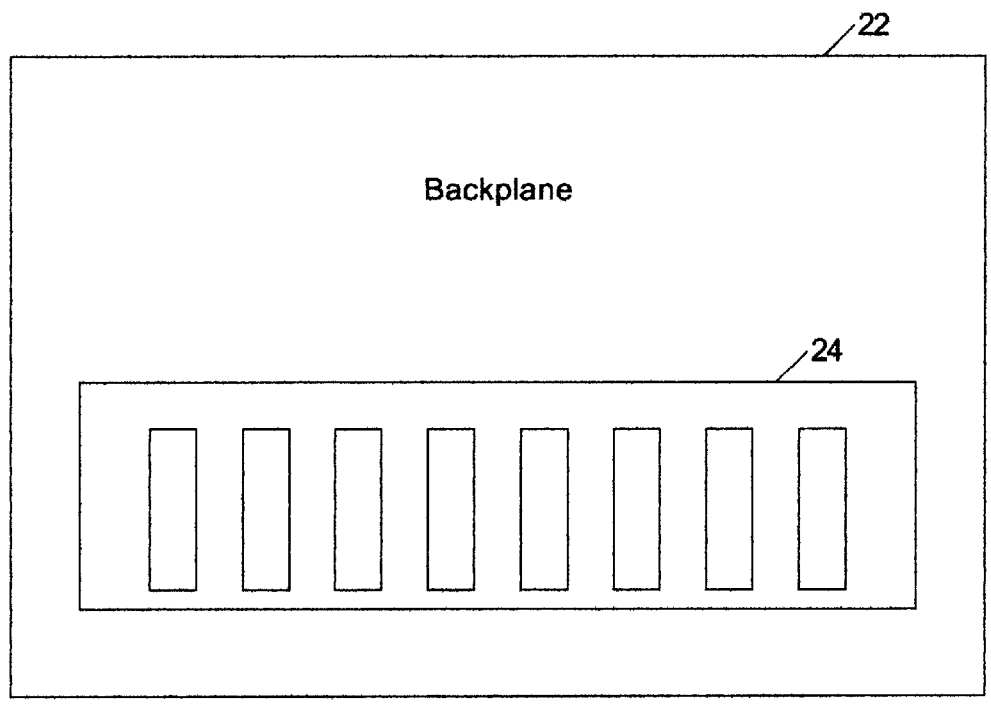
FIG. 2 is a block diagram of a typical backplane.
Figure 3:
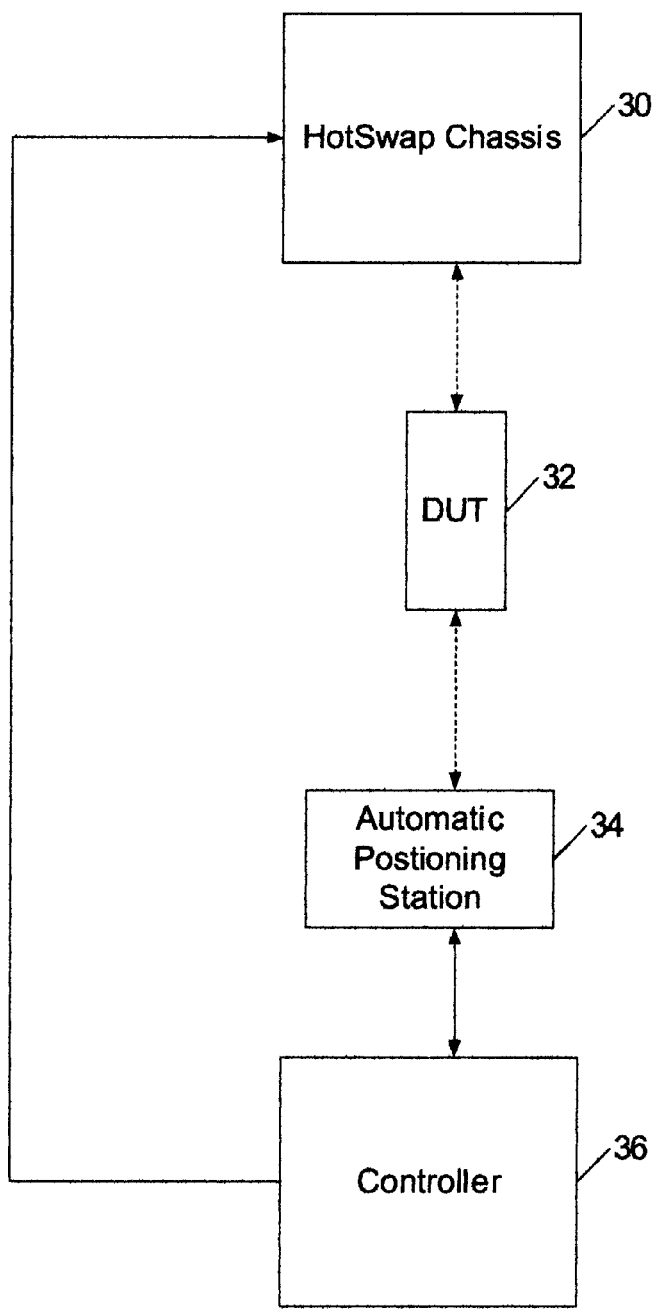
FIG. 3 is a block diagram of an exemplary system in accordance with an embodiment of the present invention

In one or more embodiments, the present invention involves a method and apparatus for automatic testing of hot-swappable CompactPCI cards. Referring to the drawings wherein like reference characters are used for like parts throughout the several views, FIG. 3 shows a block diagram of a system in accordance with an embodiment of the present invention.

The system includes a HotSwap chassis (30), an automatic positioning station (APS) (34), and a controller (36). Controller (36) is interfaced with the APS (34) and the HotSwap chassis (30) and may be connected to a computer (not shown) for further data handling, eg., verifying the status of the device under test or error-logging. The HotSwap chassis (30) is designed to receive a device under test (DUT) (32). In one embodiment, the HotSwap chassis (30) may be designed to house a backplane, a power supply, and disk drive bays. The housed backplane may be a CompactPCI HotSwap backplane including a plurality of slots adapted to receive CompactPCI cards and the DUT (32) may be a hot-swappable CompactPCI card.

The computer is in communication with the system slot board that is already inserted into the backplane via a serial communication port. The computer also communicates with the APS to indicate whether tested cards are functioning when inserted into the backplane. This communication between the computer and the system slot board enables the synchronization of activities both with the insertion/extraction of the CompactPCI cards and the amount of the CompactPCI bus transactions that are taking place on the backplane.

Figure 4:
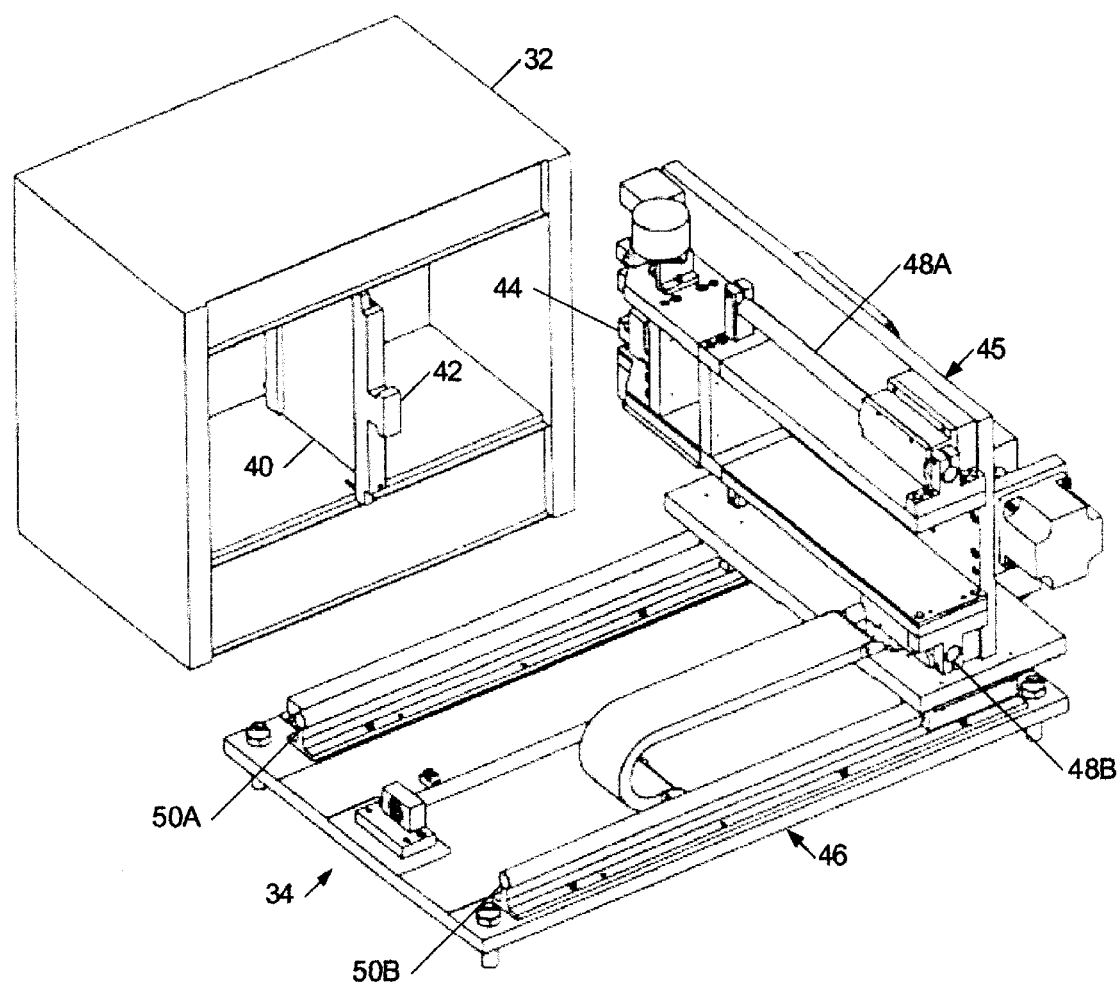
FIG. 4 is a perspective view of a exemplary system in accordance with an embodiment of the present invention

FIG. 4 shows a perspective view of an exemplary system in accordance with an embodiment of the present invention. As can be seen, HotSwap Chassis (30) receives a hot-swappable CompactPCI card (40). Hot-swappable CompactPCI card (40) is fitted with a testing face (42), which enables the APS (34) to insert and extract the card using a mating clamp (44). As shown in FIG. 4, in one embodiment, testing face (42) has a T-shaped protrusion onto which mating clamp (44) fits. Testing face (42) is used because the design of the front panel for CompactPCI cards vary and, by having a uniform way to connect and disconnect the APS (34) and the CompactPCI card (40), different types of cards may be tested. Also, multiple cards may be inserted into the backplane at one time and the APS (34) can disconnect from one and connect to another. In one embodiment, multiple mating clamps may be included to allow multiple card synchronous testing.

As can be seen, APS (34) comprises a body (45) and base (46). Two rods (48A and 48B) are mounted onto body (45). Mating clamp (44) moves forward and backward along rods (48A and 48B) to insert and extract CompactPCI card (40). Further, two rods (50A and 50B) are mounted onto the base (46). The body (45) moves along the two rods (48A and 48B) in order to transfer the CompactPCI card (40) from one slot to another in the backplane within the HotSwap Chassis (30). Those skilled in the art will appreciate that the motion along both sets of rods can be effected by a motor or the like.

The APS (34) inserts and extracts hot-swappable CompactPCI card (40) on command from the Controller (not shown). For insertion, the APS (34) exerts a force required to push the CompactPCI card (40) into the backplane in the HotSwap chassis (30) such that CompactPCI connectors are fully engaged. For extraction, the APS (34) exerts a force required to pull the CompactPCI card (40) out of the the backplane in the HotSwap chassis (30) such that the CompactPCI connectors are fully disengaged Insertion and extraction can include both single slot and multi-slot testing.

In single slot testing, the CompactPCI card (40) is inserted and extracted in a fixed slot position, i.e., the CompactPCI card (40) is not moved from one slot position to another. The CompactPCI (40) is extracted to a distance such that the CompactPCI connections are not in physical contact with the backplane and inserted to a distance such that CompactPCI connectors are fully engaged with the backplane. The insertion and extraction of the CompactPCI card (40) is accomplished by moving mating clamp (44), while in engagement with the testing face (42), along rods (48A and 48B). In multi-slot testing, the CompactPCI card (40) is moved from one slot position to another, in addition to being inserted and extracted. Thus, in multi-slot testing, mating clamp (44), while in engagement with testing face (42), is moved along rods (48A and 48B) and the body (45) is moved along rods (50A and 50B).

Figure 5:
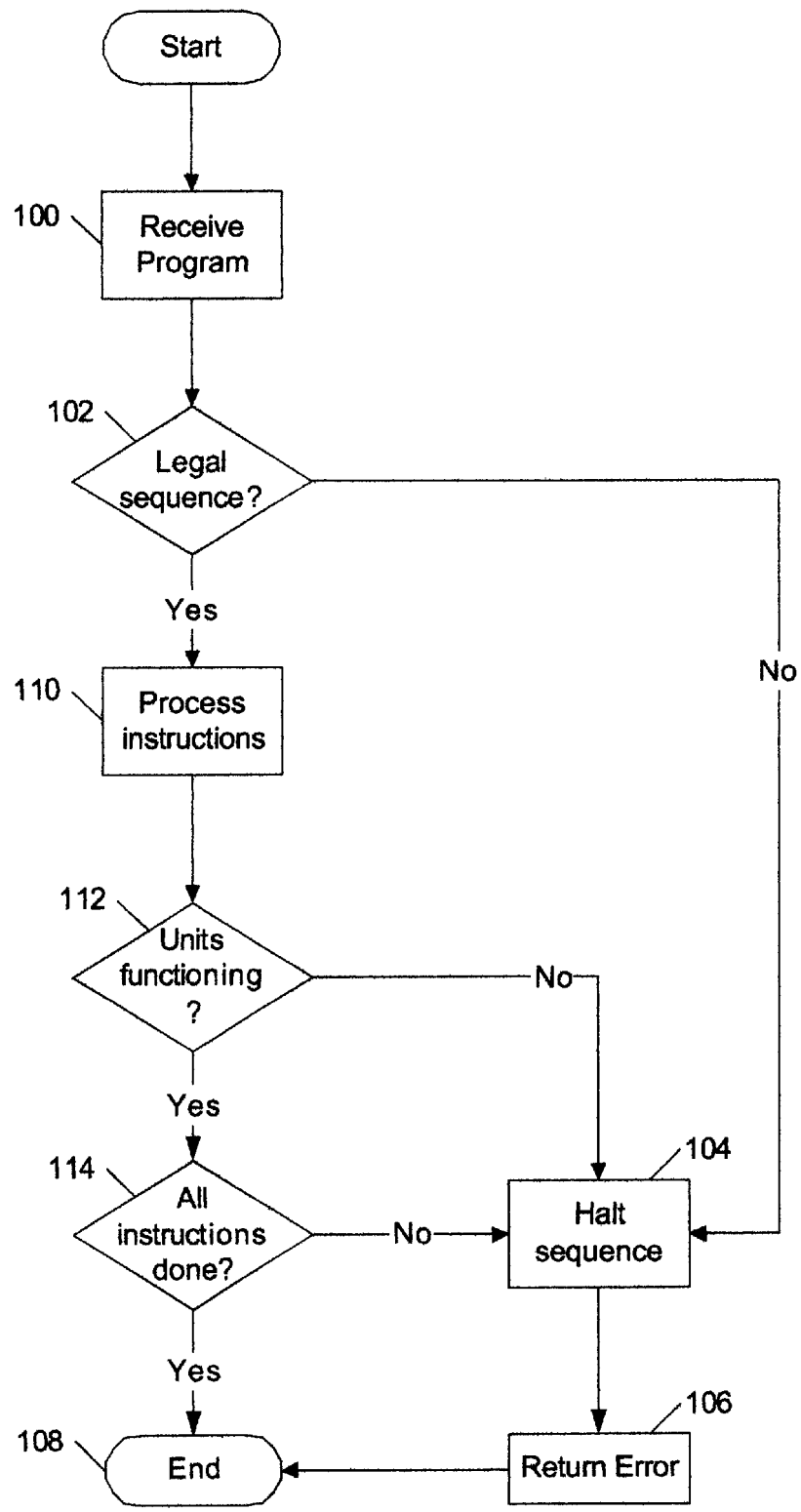
FIG. 5 is a flow chart showing an exemplary process in accordance with an embodiment of the present invention.

In multi-slot testing, a sequence of insertions and extractions may be pre-programmed. FIG. 5 is a flow chart of a method in accordance with one or more embodiments of the present invention. When a sequence of insertion and extraction instructions is received (100), the controller determines whether the programmed sequence is legal (102), e.g., whether the CompactPCI card (40) is being moved to a position that is already occupied by another CompactPCI card (40) or the sequence instructions include a movement of the CompactPCI card (40) without extraction of the card first (52). If the program is not legal (102), then testing is halted (104), an error message is returned (106), and the process ends (108). Otherwise, the controller processes the sequence of instructions and controls the APS (34) accordingly.

Upon processing of each of the instructions (110), the controller monitors the status of the backplane and CompactPCI cards involved. If an error occurs in either (112), i.e., the backplane or CompactPCI card stops functioning upon insertion or extraction, the processing of the sequence is halted (104), the error is returned (106), and the process ends (108). Otherwise, the process continues until all instructions in the sequence are processed (114).

In one or more embodiments, the controller may use a light sensitive device, e.g., a photosensor, to detect the illumination of a HotSwap LED included on the CompactPCI card in order to determine whether the CompactPCI card is functioning or control insertion and extraction of the CompactPCI card. A HotSwap LED is a standard component of hot-swappable CompactPCI cards. If the CompactPCI card is functioning properly, the HotSwap LED can be illuminated and detected. Alternatively, the controller can use the HotSwap LED to signal that it is safe to extract the CompactPCI card (40).

In one or more embodiments, the CompactPCI cards under test are placed in a uniform, fixed position with respect to the backplane prior to the start of the automated insertion/extraction testing, e.g., the position may be where a fully inserted CompactPCI card is pulled out of the backplane such that the connectors are fully disengaged. In this exemplary case, CompactPCI can be easily identified as inserted or extracted. Further, an infrared emitter, or other sensor, set may be placed on either side of the chassis to detect "out-of-line" CompactPCI cards. Using this detection, the system can ensure that the body of the APS does not hit and potentially damage any of the improperly positioned CompactPCI boards being tested.

Advantages of the present invention may include one or more of the following. The automatic insertion/extraction test equipment automates the previously manual process thereby making the testing process more efficient. Also, the automatic test equipment is useful in hostile test environments, e.g., extreme temperature conditions. Moreover, the equipment can be programmed to perform various combinations of insertion/extraction and location change for device under test and performs these combinations uniformly for every device tested. Long term tests can be done with precision and consistency.

While the invention has been described with respect to a limited number of embodiments, those skilled in the art will appreciate that other embodiments can be devised which do not depart from the scope of the invention as disclosed herein.

What is claimed is:

1. A system for testing insertion and extraction of a hot-swappable card comprising:
   an automatic positioning station that inserts the hot-swappable card into a backplane and extracts the hot-swappable card from the backplane, wherein the automatic positioning system is moveable so as to be capable of inserting and extracting the hot-swappable card into and from any one of a plurality of slots in the backplane; and handling
   a controller that directs the operation of the automatic positioning station and determines whether the hot-swappable card is functioning when inserted into the backplane.

2. The system of claim 1, further comprising:
   a testing face for the hot-swappable card that enables connection and disconnection with the automatic positioning station.

3. The system of claim 1, further comprising:
   a hotswap chassis for housing the backplane.

4. The system of claim 1 wherein the hot-swappable card is a CompactPCI card.

5. A system for testing insertion and extraction of a hot-swappable card comprising:
   an automatic positioning station that inserts the hot-swappable card into a backplane and extracts the hot-swappable card from the backplane; and
   a controller that directs the operation of the automatic positioning station and determines whether the hot-swappable card is functioning when inserted into the backplane,
   wherein the backplane comprises a plurality of slots for accepting hot-swappable cards,
   wherein the automatic positioning station inserts and extracts the hot-swappable card from each of the plurality of slots in the backplane.

6. A method of testing insertion and extraction of a hot-swappable card comprising:
   inserting the hot-swappable card into a backplane;
   determining whether the hot-swappable card is functioning when inserted in the backplane; and
   extracting the hot-swappable card from the backplanes,
   wherein the inserting and extracting are capable of occurring at any one of a plurality of slots in the backplane.

7. The method of claim 6 wherein the backplane comprises a plurality of slots, the method further comprising:
   inserting the hot-swappable card into a slot in the backplane;
   determining whether the hot-swappable card is functioning when inserted in the slot;
   extracting the hot-swappable card from the slot;
   inserting the hot-swappable card into another slot in the backplane; and
   determining whether the hot-swappable card is functioning when inserted in the another slot.

8. A software tool for use in testing of a hot-swappable card insertion and extraction comprising:
   a processor;
   memory in communication with the processor; and
   software residing in the memory and executable on the processor for
      instructing an automatic positioning station to insert the hot-swappable card into a backplane and extract the hot-swappable card from the backplane, wherein the automatic positioning system is moveable so as to be capable of inserting and extracting the hot-swappable card into and from any one of a plurality of slots in the backplane; and
   determining whether the hot-swappable card is functioning when inserted in the backplane.

9. The software tool of claim 8, wherein the backplane comprises a plurality of slots for receiving cards and the software is further for instructing the automatic positioning station to insert the hot-swappable card into a slot in the backplane;

determining whether the hot-swappable card is functioning when inserted in the slot;

instructing the automatic positioning station to extract the hot-swappable card from the slot;

instructing the automatic positioning station to insert the hot-swappable card into another slot in the backplane; and determining whether the card is functioning when inserted in the another slot.

10. The software tool of claim 9, wherein the software is further for receiving a sequence of insertion and extraction instructions;

determining whether the sequence of instructions is valid;

instructing the automatic positioning station to insert and extract the hot-swappable card into the backplane in accordance with the sequence of instructions; and determining whether the hot-swappable card is functioning when inserted into the backplane.

11. The software tool of claim 10, wherein the sequence of insertion and extraction instructions comprises instructions to insert and extract the hot-swappable card from a slot in the backplane; and instructions to insert and extract the hot-swappable card from another slot in the backplane.

12. An apparatus for testing of a hot-swappable card insertion and extraction comprising:

a backplane comprising a plurality of slots for receiving cards;

an automatic positioning station for inserting and extracting the hot-swappable card into the plurality of slots in the backplane; and a computer in communication with the backplane and the automatic positioning system comprising a processor;

memory; and software residing on the memory and executable on the processor for directing the automatic positioning station to insert and extract the hot-swappable card; and determining whether the hot-swappable card is functioning when inserted into the backplane.

13. The apparatus of claim 12, wherein the software is further for instructing the automatic positioning station to insert the hot-swappable card into a slot in the backplane;

determining whether the hot-swappable card is functioning when inserted in the slot;

instructing the automatic positioning station to extract the hot-swappable card from the slot;

instructing the automatic positioning station to insert the hot-swappable card into another slot in the backplane; and determining whether the card is functioning when inserted in the another slot.

14. The apparatus of claim 12, further comprising:

a testing face for the hot-swappable card that enables connection and disconnection with the automatic positioning station.

15. The apparatus of claim 12, wherein the hot-swappable card is a CompactPCI card.

16. An apparatus for testing of a hot-swappable card insertion and extraction comprising:

means for inserting the hot-swappable card into a backplane, wherein the means for inserting is moveable so as to be capable of inserting the hot-swappable care into any one a plurality of slots in the backplane;

means for determining whether the hot-swappable card is functioning when inserted in the backplane; and means for extracting the hot-swappable card from the backplane.

17. The apparatus of claim 16 wherein the backplane comprises a plurality of slots, the apparatus further comprising:

means for inserting the hot-swappable card into a slot in the backplane;

means for determining whether the hot-swappable card is functioning when inserted in the slot;

means for extracting the hot-swappable card from the slot;

means for inserting the hot-swappable card into another slot in the backplane; and means for determining whether the hot-swappable card is functioning when inserted in the another slot.

18. The apparatus of claim 16, further comprising:

means for connecting and disconnecting the hot-swappable card with the means for inserting and the means for extracting.

19. The apparatus of claim 16, further comprising:

means for housing the backplane.

* * * * *

UNITED STATES PATENT AND TRADEMARK OFFICE
CERTIFICATE OF CORRECTION

PATENT NO.     : 6,782,442 B2
DATED          : August 24, 2004
INVENTOR(S)    : Stephen C. Seto et al.

It is certified that error appears in the above-identified patent and that said Letters Patent is hereby corrected as shown below:

<u>Title page,</u>
Item [75], Inventors, please insert -- Lucy Trang, San Jose, CA (US) --

Signed and Sealed this

Thirtieth Day of November, 2004

JON W. DUDAS
*Director of the United States Patent and Trademark Office*